United States Patent [19]

Segesman

[11] 4,360,777
[45] Nov. 23, 1982

[54] INDUCTION DIPMETER APPARATUS AND METHOD
[75] Inventor: Francis Segesman, Ridgefield, Conn.
[73] Assignee: Schlumberger Technology Corporation, New York, N.Y.
[21] Appl. No.: 108,732
[22] Filed: Dec. 31, 1979
[51] Int. Cl.³ ............................................. G01V 3/28
[52] U.S. Cl. .................................... 324/339; 324/343
[58] Field of Search ............... 324/330, 334, 339, 343, 324/346, 242, 243, 232

[56] References Cited
U.S. PATENT DOCUMENTS

| | | | |
|---|---|---|---|
| 2,623,924 | 12/1952 | Cartier et al. | 324/330 |
| 2,794,949 | 6/1957 | Hedstrom et al. | 324/330 X |
| 2,919,397 | 12/1959 | Morley | 324/334 |
| 2,955,250 | 10/1960 | Shaw et al. | 324/330 |
| 3,014,177 | 12/1961 | Hungerford et al. | 324/343 |
| 3,187,252 | 6/1965 | Hungerford | 324/343 |
| 3,510,757 | 5/1970 | Huston | 324/343 |
| 3,561,007 | 2/1971 | Gouilloud et al. | 324/346 X |
| 3,609,521 | 9/1971 | Des Brandes | 324/343 |
| 3,808,520 | 4/1974 | Runge | 324/343 |

*Primary Examiner*—Gerard R. Strecker
*Attorney, Agent, or Firm*—Martin Novack

[57] ABSTRACT

Apparatus and method are disclosed for determining properties of subsurface formations surrounding a borehole by induction logging. The properties which can be determined include the formation dip angle and dip azimuth angle. Indications of formation anisotropy can also be obtained. An array of individually energizable transmitter coils is provided, preferably including three coils having mutually orthogonal axes. Electronic transmitter steering circuitry is provided for controlling the energizing means to electronically steer the direction of the magnetic moment resulting from the magnetic field components generated by the transmitter coils. An array of receiver coils is also provided along with receiver processing circuitry for processing signals induced in the receiver coils. The array of receiver coils preferably includes three receiver coils having mutually orthogonal axes. The receiver processing circuitry is capable of individually sensing the signals induced in the receiver coils and operates to combine the sensed signals. The receiver processing circuitry also includes electronic receiver steering circuitry for controlling the relative amplification of the sensed signals to steer the effective sensing direction of the receiver. The receiver steering circuitry is coordinated with the transmitter steering circuitry and is operative to rotate the effective sensing direction of the receiver in a plane perpendicular to the direction of the transmitter magnetic moment.

31 Claims, 6 Drawing Figures

INDUCTION DIPMETER APPARATUS AND METHOD

DESCRIPTION

1. Technical Field

This invention relates to an apparatus and method for determining properties of subsurface formations surrounding a borehole. The properties which can be determined include the dip angle and dip azimuth angle of anisotropic formation beds. The invention has particular utility in determining the presence and orientation of fractures, and is especially useful in open boreholes or in boreholes filled with a drilling fluid that is relatively nonconductive as compared to the formations being logged.

2. Background Art

It is common practice to obtain measurements in the dip angle and azimuthal angle (also called the dip azimuth angle) of formation bedding planes by passing through an earth borehole a "dipmeter" tool having a plurality of circumferentially spaced pad mounted electrodes. Survey current is emitted from certain ones of the electrodes on each pad member to obtain a measure of the resistivity or conductivity of the adjoining earth formations to produce a plurality of resistivity logs. By properly correlating the fluctuations of these resistivity logs, the positioning of a bedding plane relative to the tool position can be readily calculated. Then, by measuring the bearing of the tool relative to some azimuthal reference, such as magnetic north, and the inclination of the tool relative to the true vertical or gravitational axis, the position of a bedding plane relative to the north and true vertical axes can be determined.

While conventional multiple pad dipmeter devices have provided generally satisfactory results, there are some difficulties inherent in these devices. For example, it is generally necessary to perform accurate correlations of a number of signals. Further, if the borehole is open-hole or filled with a relatively nonconductive drilling mud, such as an oil base drilling mud, the pad mounted electrodes need to make reasonably good contact with the formations surrounding the borehole in order to be assured of valid measurements.

Another type of dipmeter device that has been proposed is the so-called "induction dipmeter" which uses principles of induction logging to measure dip. Conventional induction logging employs coils wound on an insulating mandrel. One or more transmitter coils are energized by an alternating current. The oscillating magnetic field produced by this arrangement results in the induction of currents in the formations which are nearly proportional to its conductivity. These currents, in turn, contribute to the voltage induced in receiver coils. By selecting only that voltage component which is in-phase with the transmitter current, a signal is obtained that is approximately proportional to the formation conductivity. The transmitting coils of a conventional induction logging apparatus tend to induce secondary current loops in the formations which are concentric with the transmitting and receiving coils. However, certain conditions of the surrounding earth formations, such as dipping beds or fractures, can cause the average plane of these secondary current loops to vary from a concentric alignment. Induction dipmeters attempt to use this phenonmenon to advantage by measuring the voltage induced in coils having different orientations. In one type of prior art induction dipmeter scheme, a coil array is mechanically rotated at a constant frequency to produce modulation components in receiver coil signals at the frequency of rotation of the coil array. These modulation components are processed to obtain indications of the dip and/or dip azimuth of formation bedding planes. A disadvantage of this type of induction dipmeter is the requirement for bulky and power consuming equipment for rotating the coil array and for keeping track of the orientation of the coil array as it rotates. Accordingly, mechanically rotating induction dipmeters have not achieved significant commercial acceptance. Examples of mechanically rotating induction devices can be found in U.S. Pat. Nos. 3,014,177, 3,187,352, and 3,561,007.

In addition to schemes which utilize mechanically rotating coils, prior art proposals have also been set forth for utilizing mechanically passive induction coils to obtain measurements of formation dip and/or anisotropy. For example, in the U.S. Pat. No. 3,510,757, vertical (i.e., aligned with the borehole axis) transmitter coils are used in conjunction with a pair of orthogonal, horizontal (i.e., perpendicular to the borehole axis) receiver coils. The outputs of the receiver coils are recorded and utilized to obtain indications of formation dip angle. In the U.S. Pat. No. 3,808,520, a vertical transmitter coil is used in conjunction with three receiver coils having mutually orthogonal axes; i.e., one vertical and two mutually orthogonal horizontal coils. The outputs of the three receiver coils are utilized in specified relationships to obtain combined dip and anisotropy information.

It is among the objects of the present invention to provide an induction logging technique which is an improvement over existing induction logging schemes for obtaining dip and/or anisotropy information, and which is particularly effective in situations where the formations being logged are much more highly conductive than the borehole medium in which a logging device is disposed.

DISCLOSURE OF INVENTION

The present invention is directed to an apparatus and method determining properties of subsurface formations surrounding a borehole. The properties which can be determined include the formation dip angle and dip azimuth angle. Indications of formation anisotropy can also be obtained. In accordance with the apparatus of the invention, an array of transmitter coils is provided, along with means for individually energizing the transmitter coils. The array of transmitter coils preferably includes three transmitter coils having mutually orthogonal axes. Electronic transmitter steering means are provided for controlling the energizing means to electronically steer the direction of the magnetic moment resulting from the magnetic field components generated by the transmitter coils. An array of receiver coils is also provided, along with receiver processing means for processing signals induced in the receiver coils. The array of receiver coils preferably includes three receiver coils having mutually orthogonal axes.

In the preferred embodiment of the invented apparatus, the receiver processing means includes means for individually sensing the signals induced in the receiver coils and for combining the sensed signals. In this embodiment, the receiver processing means further includes electronic receiver steering means for controlling the relative sensitivities of the individual sensing means to steer the effective sensing direction of the receiver processing means. The electronic receiver steering means is coordinated with the electronic transmitter steering means and is operative to steer the effective sensing direction of the receiver processing means in a direction substantially perpendicular to the direction of the transmitter magnetic moment. In particular, the electronic receiver steering means operates to vary the effective sensing direction of the receiver processing means in a plane which is substantially perpendicular to the direction of the transmitter magnetic moment.

In accordance with an embodiment of the method of the invention, there is set forth a technique for determining the dip and/or dip azimuth of a formation bedding plane surrounding a borehole, including the steps of:

(a) transmitting electromagnetic energy into the formations from an electronically steerable transmitter with the borehole;
(b) receiving, at an electronically steerable receiver within the borehole, induced electromagnetic signals;
(c) rotating the receiver direction in a plane substantially perpendicular to the direction of said transmitter;
(d) detecting the receiver output;
(e) varying the transmitter direction as a function of the receiver output; and
(f) repeating steps (c), (d), and (e) until the transmitter direction is substantially perpendicular to the formation bedding plane.

In the preferred embodiment of the method of the invention, the transmitter azimuthal direction is varied as a function of the phase of the receiver output. Also, in this embodiment, the transmitter tilt direction is varied as a function of the peak magnitude of the receiver output.

Further features and advantages of the invention will become more readily apparent from the following detailed description when taken in conjunction with the accompanying drawings.

BEST MODE FOR CARRYING OUT THE INVENTION

Figure 1A:
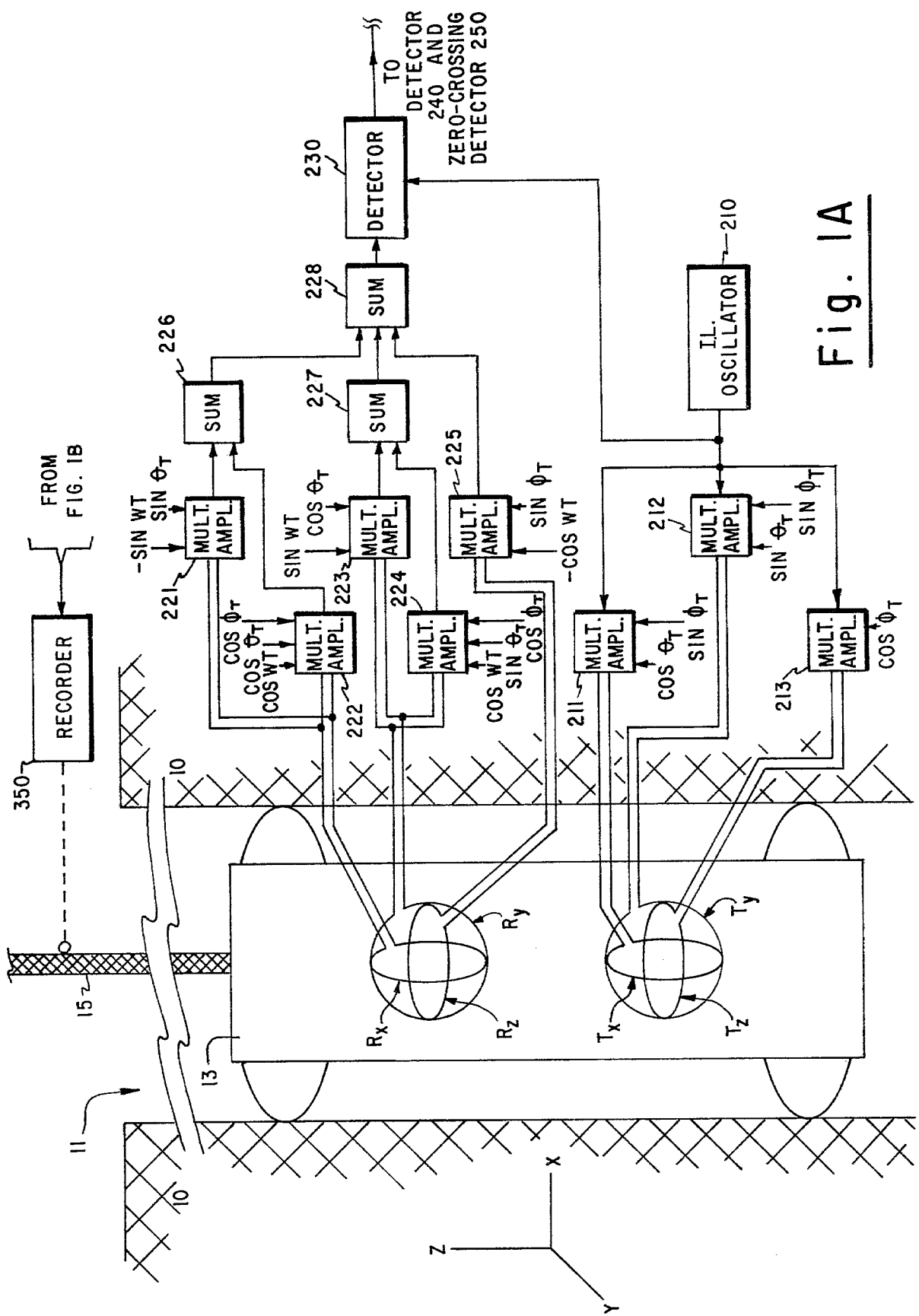
FIG. 1, consisting of FIGS. 1A and 1B placed side-by-side, illustrates an embodiment of the invention in a borehole, along with a schematic representation, partially in block form, of the coil arrays and associated circuitry.
Figure 1B:
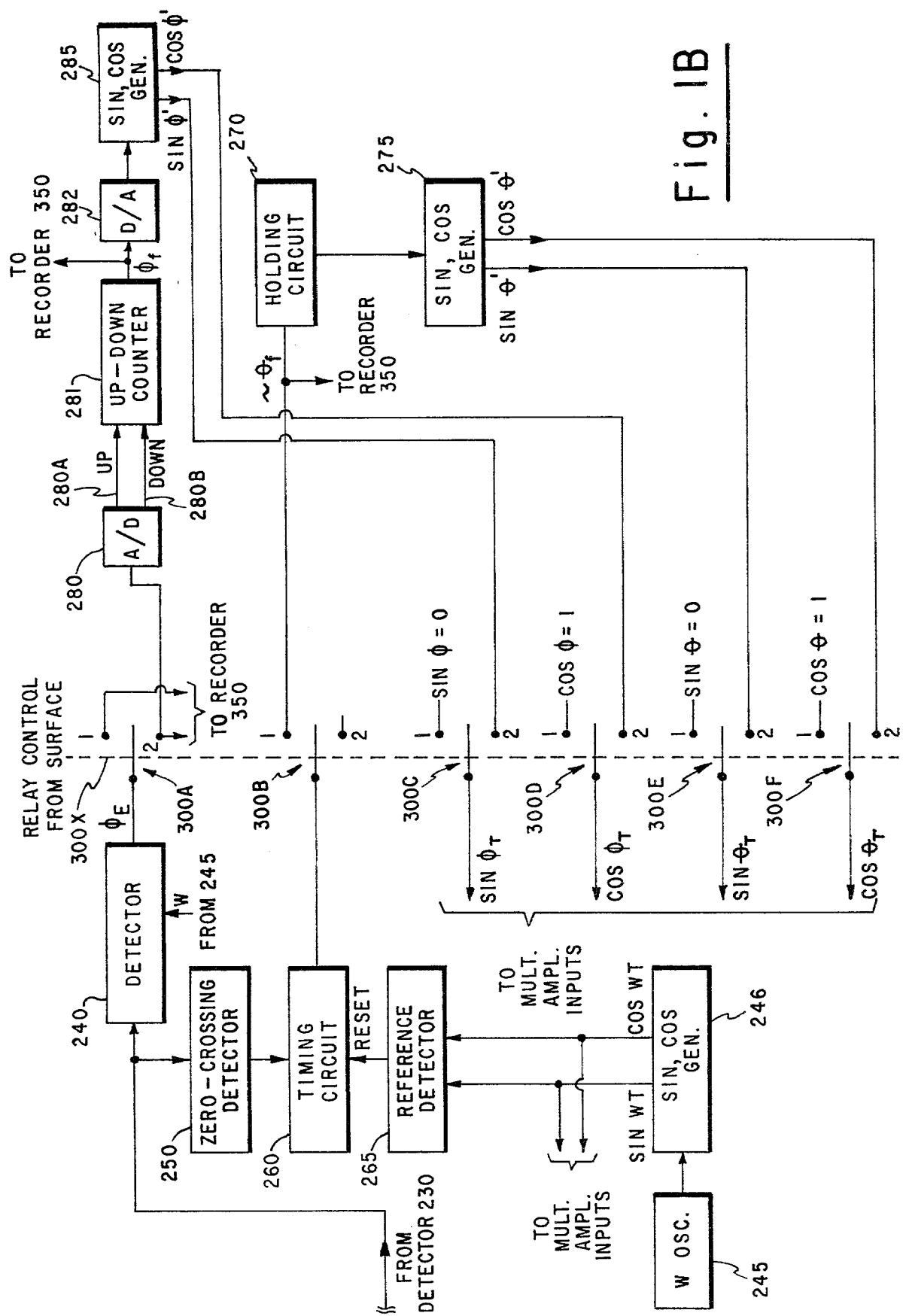

Referring to FIG. 1, there is shown a representative embodiment of an induction logging apparatus in accordance with the present invention for investigating earth formations 10 traversed by a borehole 11. It is preferred that the invention be employed in situations where the borehole is either filled with a drilling fluid that is relatively nonconductive as compared to the formations being logged, or is empty hole. The downhole device of the logging apparatus includes coils mounted on a centralized support member 13 adapted for movement through the borehole 11. The downhole device also includes a fluid-tight enclosure which contains electronic circuitry, this circuitry being shown in block diagram form at the side of the borehole. The downhole device is suspended from the surface of the earth by an armored multiconductor cable 15. A suitable drum and winch mechanism (not shown) is located at the surface of the earth for raising and lowering the device through the borehole. Also located at the surface of the earth may be a power supply (not shown) for supplying electrical energy by way of the cable 15 to the downhole equipment.

The downhole device includes an array of transmitter coils having mutually orthogonal axes and designated $T_x$, $T_y$ and $T_z$, and an array of receiver coils having mutually orthogonal axes and designated $R_x$, $R_y$ and $R_z$. In the present embodiment, the transmitter coil $T_z$ and the receiver coil $R_z$ have their axes aligned with the borehole axis; i.e., the z direction in FIG. 1. The transmitter coil $T_x$ and the receiver coil $R_x$ have their axes aligned perpendicular to the borehole axis and in the x direction in FIG. 1. The transmitter coil $T_y$ and the receiver coil $R_y$ have their axes perpendicular to both the borehole axis and perpendicular to the x direction; i.e., in the y direction in FIG. 1. (For ease of explanation, the logging device is assumed to be aligned with the z axis in a vertical borehole. Coordinate corrections can be implemented, in known manner, using signals from a compass and an inclinometer.) The transmitter coils preferably, although not necessarily, have intersecting axes and may be concentric, as shown. The same is true of the receiver coils. The transmitter-to-receiver spacing is preferably, although not necessarily, quite short, for example, of the order of one foot or less. In fact, the transmitter and receiver may, if desired, be at substantially the same location.

As described briefly above, an aspect of the invention involves electronically steering the direction of the magnetic moment resulting from the magnetic field components generated by the transmitter coils. A further aspect of the invention involves "steering" at the receiver by controlling the relative sensitivities of sensing means that are coupled to the receiver coils. Before describing the circuitry utilized to implement these functions, some theoretical considerations shall be set forth.

Figure 2:
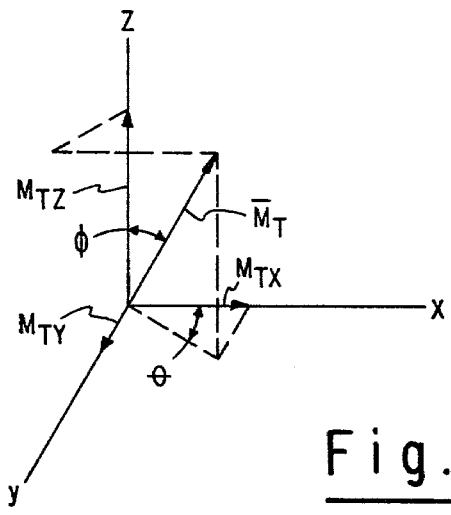
FIG. 2 illustrates the transmitter magnetic moment unit vector and its components.

A small induction logging coil carrying a current can be represented as a magnetic dipole having a magnetic moment proportional to the current. The direction and strength of magnetic moment can be represented by a vector perpendicular to the plane of the coil. Three such coils with mutually perpendicular axes (such as the transmitter coils in FIG. 1) can be represented by three corresponding magnetic moment vectors. By combining mutually perpendicular vectors of appropriate magnitudes, one can obtain a resultant magnetic moment vector designated $\overline{M}_T$, in any desired direction and magnitude. Thus, by passing currents of appropriate relative magnitudes through three mutually perpendicular coils, one can obtain a magnetic field that is theoretically equivalent to the magnetic field of a single coil with any desired orientation. Reference is made, for example, to FIG. 2 which illustrates magnetic moments designated $M_{TX}$, $M_{TY}$, and $M_{TZ}$, and a resultant magnetic moment $\overline{M}_T$, which is at a (tilt) angle $\phi$ with respect to the z axis and which has a projection on the xy plane at an (azimuthal) angle $\theta$.

Directionality can also be attributed to the receiver, as follows: If the sensitivities (or amplification factors) of the circuits coupled to individual receiver coils are appropriately selected, the resultant of the signals induced in the three mutually orthogonal coils can be "steered" to any desired direction. For example, one could consider each of the receiver coils as having a coil moment represented as a vector. The magnitude of the coil moment for each individual coil is proportional to the product of the number of turns times the cross-sectional area of the turns times the adjustable sensitivity (or amplification) attributable to the coil. A receiver coil moment vector, $\overline{M}_R$, can be considered as being made up of the sum of three coil mement components designated $M_{RX}$, $M_{RY}$, and $M_{RZ}$, which correspond to the contributions from three coils having axes in the x, y, and z directions.

The transmitter vector $\overline{M}_T$ illustrated in FIG. 2, can be expressed in vector notation in terms of the angles $\phi$ and $\theta$ at the transmitter, these angles being designated as $\phi_T$ and $\theta_T$, respectively. The expression for $\overline{M}_T$ is:

$$\overline{M}_T = M_T[\bar{i}\cos\theta_T\sin\phi_T + \bar{j}\sin\theta_T\sin\phi_T + \bar{k}\cos\phi_T] \quad (1)$$

where $M_T$ is an amplitude constant and $\bar{i}$, $\bar{j}$ and $\bar{k}$ are unit vectors in the x, y and z directions, respectively. The angles $\phi_T$ and $\theta_T$ can be visualized as defining the orientation of the resultant transmitter magnetic moment vector, $\overline{M}_T$. Stated another way, to achieve a vector orientation ($\phi_T$, $\theta_T$), the currents supplied to the transmitter coils of FIG. 1 should be in accordance with the following Table I (assuming the coils have the same number of turns):

TABLE I

| coil | current proportional to: |
|---|---|
| $T_x$ | $\cos\theta_T\sin\phi_T$ |
| $T_y$ | $\sin\theta_T\sin\phi_T$ |
| $T_z$ | $\cos\phi_T$ |

Now, consider the following expression for a receiver coil moment vector, $\overline{M}_R$:

$$\overline{M}_R = M_R[\bar{i}(-\sin\omega t\sin\theta_T + \cos\omega t\cos\theta_T\cos\phi_T) + \bar{j}(\sin\omega t\cos\theta_T + \cos\omega t\sin\theta_T\cos\phi_T) - \bar{k}\cos\omega t\sin\phi_T] \quad (2)$$

where $M_R$ is an amplitude constant. It can be verified that this receiver coil moment vector is perpendicular to the transmitter magnetic moment vector $\overline{M}_T$, and that it rotates around $\overline{M}_T$ at an angular frequency $\omega$. For example, if one takes the scalar product $\overline{M}_T\cdot\overline{M}_R$, it is zero for all values of $\omega$. This can be seen by multiplying the $\bar{i}$ terms, the $\bar{j}$ terms, and the $\bar{k}$ terms to obtain the following products:

Product of $\bar{i}$ terms:

$\cos\theta_T\sin\phi_T(-\sin\omega t\sin\theta_T+\cos\omega t\cos\theta_T\cos\phi_T) = -\cos\theta_T\sin\theta_T\sin\phi_T\sin\omega t + \cos^2\theta_T\sin\phi_T\cos\phi_T\cos\omega t$ Product of $\bar{j}$ terms:

$\sin\theta_T\sin\phi_T(\sin\omega t\cos\theta_T+\cos\omega t\sin\theta_T\cos\phi_T) = \cos\theta_T\sin\theta_T\sin\phi_T\sin\omega t + \sin^2\theta_T\sin\phi_T\cos\phi_T\cos\omega t$ Product of $\bar{k}$ terms:

$-\cos\phi_T(\cos\omega t\sin\phi_T) = -\cos\phi_T\sin\phi_T\cos\omega t$

When these terms are added together, the result is zero. In particular, the first terms of $\bar{i}$ and $\bar{j}$ products cancel. The sum of the second terms of the $\bar{i}$ and $\bar{j}$ products cancel with the single $\bar{k}$ product term. Thus, the following Table II, sets forth the relative sensitivities (or amplification factors) for the respective receivers which produces an effective resultant receiver coil moment that is perpendicular to the transmitter coil magnetic moment $\overline{M}_T$, and rotates in the plane perpendicular to $\overline{M}_T$ at an angular frequency $\omega$:

TABLE II

| coil | receiver amplification |
|---|---|
| $R_x$ | $-\sin\omega t\sin\theta_T + \cos\omega t\cos\theta_T\cos\phi_T$ |
| $R_y$ | $\sin\omega t\cos\theta_T + \cos\omega t\sin\theta_T\cos\phi_T$ |
| $R_z$ | $-\cos\omega t\sin\phi_T$ |

In Table II, it is assumed that each coil has the same cross-sectional area and number of turns, so the factors set forth can be implemented by providing appropriate relative amplification to amplifiers that are used in conjunction with the individual receiver coils.

In accordance with the preferred form of the invention, the resultant of the receiver coil moments (collectively referred to as the receiver vector $\overline{M}_R$) is caused to rotate around the transmitter vector $\overline{M}_T$, and a generally sinusoidally varying signal will usually be obtained at the receiver output. As will be explained further hereinbelow, the amplitude of the receiver output signal will depend upon the dip angle and degree of anisotropy of the surrounding formations. The relative phase of the receiver output signal will be a function of the dip azimuth angle of the surrounding formations. Using information from the receiver output, the angles of the transmitter vector $\overline{M}_T$, i.e., $\phi_T$ and $\theta_T$, are adjusted such that the transmitter vector tends to become perpendicular to the bedding plane of the surrounding formations. When this condition occurs, a substantial null is expected at the receiver output. This follows from the recognition that virtually no signal is induced between two perpendicular induction coils if one of the coils is aligned with the formation bedding plane. The transmitter tilt and azimuthal angles which yield a substantially null condition at the receiver output can therefore be recorded as a measure of the formation dip and dip azimuth angles at the given formation depth level.

Figure 3:
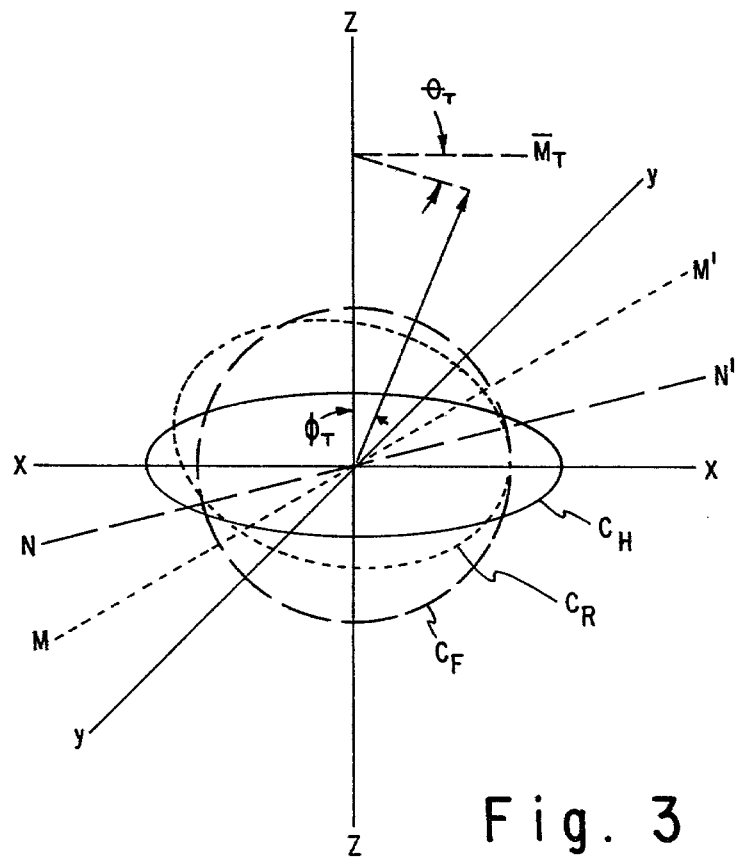
FIG. 3 is useful in understanding geometric relationships relating to the invention.

To obtain a further understanding of the techniques to be employed, consider FIG. 3 wherein a transmitter vector $\overline{M}_T$ is shown as being oriented at a tilt angle $\phi_T$ and an azimuthal angle $\theta_T$. The circle $C_R$ (in dotted line) represents the plane of rotation of the receiver vector $\overline{M}_R$, this circle being perpendicular to the transmitter vector as described above. The circle $C_F$ (in dashed line) represents the formation bedding plane having a dip and dip azimuth that are to be determined. The circle $C_H$ (in solid line) represents the horizontal plane; i.e., the x,y plane in the present coordinate system. The intersection of circles $C_F$ and $C_H$ is the line NN' which is perpendicular to the dip azimuth of the formation bedding. The intersection between the circles $C_R$ and $C_H$ is a line MM'. At a given arbitrary transmitter orientation, MM' will be different than NN'. The technique of the invention strives to bring MM' into coincidence with NN' (i.e., to adjust $\theta_T$ to obtain coincidence of azimuth) and then to tilt the receiver circle $C_R$ until it coincides with $C_F$ (i.e., to adjust $\phi_T$ to obtain coincidence of dip). This is done by appropriately adjusting the direction of the transmitter vector $\overline{M}_T$ as a function of the observed receiver output signal.

Figure 4:
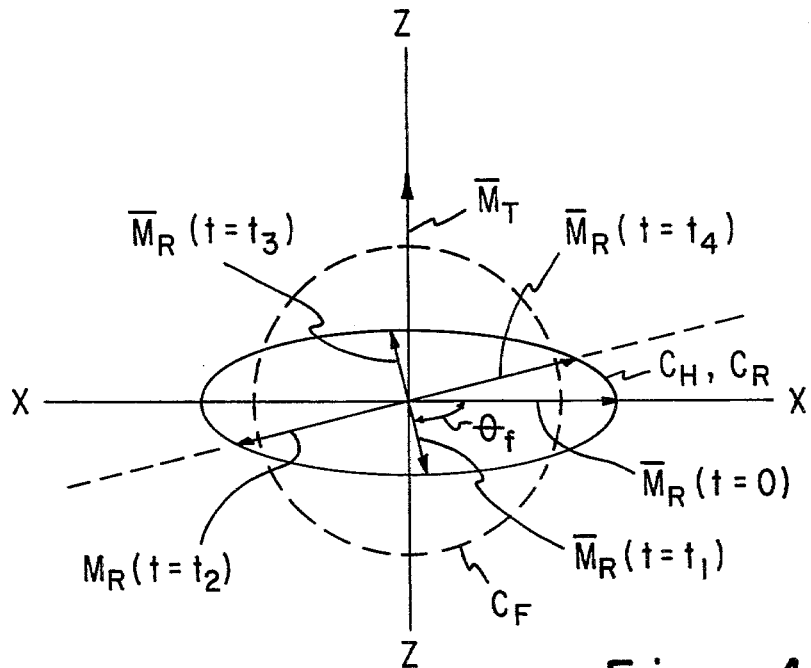
FIG. 4 illustrates geometric relationships relating to the beginning of a measuring sequence in accordance with an embodiment of the invention.

A measuring sequence in accordance with an embodiment of the invention is as follows: Initially, the transmitter is energized in such a way that $\overline{M}_T$ is oriented along the z axis (see FIG. 4). In terms of the coil system of FIG. 1, this means that only the horizontal transmitter coil $T_z$ is energized. The effective receiver coil sensitivities are initially adjusted (by adjusting their associated amplifiers, as will be described) so as to effectively place the receiver circle $C_R$ in the horizontal plane; i.e., with the receiver vector $\overline{M}_R$ rotating in the x,y plane at an angular frequency $\omega$. This situation is illustrated in FIG. 4 where the receiver circle is again represented by $C_R$. In terms of the FIG. 1 system, this would mean that only the signals from the coils $R_x$ and $R_y$ would contribute to the receiver output signal. The stated transmitter starting condition means that the value of transmitter tilt angle $\phi_T$ is initialized at zero, so that $\sin \phi_T=0$ and $\cos \phi_T=1$. The starting value of the transmitter azimuthal angle $\theta_T$ is arbitrarily initialized at zero, so $\sin \theta_T=0$ and $\cos \theta_T=1$. It follows from equation (2) that the receiver vector $\overline{M}_R$ for the starting conditions can be expressed as $$\overline{M}_R = M_R(\bar{i} \cos \omega t - \bar{j} \sin \omega t) \qquad (3)$$

It is seen that for the starting conditions, the receiver vector $\overline{M}_R$ will be aligned with the x axis at a reference time $t=0$.

Figure 5:
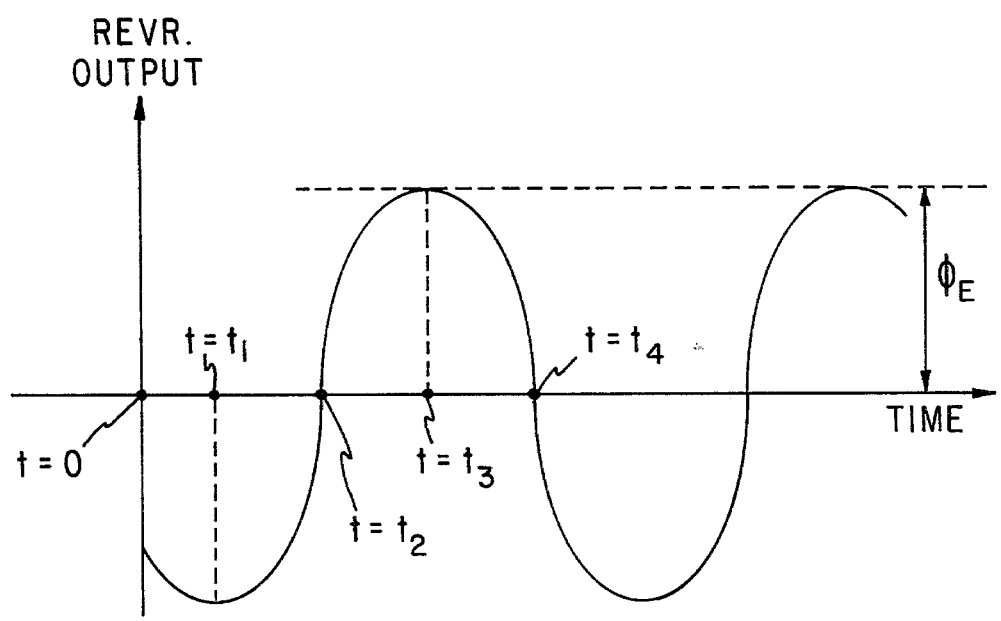
FIG. 5 illustrates the typical receiver output signal waveform that is processed in accordance with the invention.

For the stated starting conditions, if a formation dip exists relative to the z axis, and if the formation has significant anisotropy, then the receiver will produce an output that varies in amplitude as a function of the receiver vector position. With the receiver vector rotating as a function of $\omega t$, the receiver output will vary sinusoidally as a function of time, t. Nulls of the receiver output will occur at the times when $\overline{M}_R$ intersects the formation bedding plane; i.e., at $t=t_2$ and $t=t_4$ in FIG. 4. The peaks of the receiver output will occur at the times when $\overline{M}_R$ is aligned with the dip azimuth of the formation; i.e., at $t=t_1$ and $t=t_3$. A typical receiver output for the starting condition is illustrated in FIG. 5. The amplitude of the sinusoidal waveform of FIG. 5 is called the "dip error signal" designated $\phi_E$. The dip error signal is an indication of the size of the angle by which the transmitter vector will ultimately have to be rotated from the z axis to make it perpendicular to the bedding plane circle $C_F$. The existence of a dip error signal, $\phi_E$, under the starting conditions can be recorded, if desired, as evidence of the presence of dip and anisotropy. If the initial dip error signal is zero, it means that there may be insufficient anisotropy to allow measurement of dip. If the formation is otherwise known to be anisotropic, then the dip is the same as the orientation of the coordinate system of the measuring device (i.e., in the z direction in the present simplified case).

If the starting dip error signal, $\phi_E$, is appreciable, the formation dip azimuth angle, $\theta_f$ (shown in FIG. 4), can be determined from the relative "phase" of the receiver output signal. This can be achieved by measuring the time between a known reference of the rotating receiver vector (e.g. at $t=0$), and an appropriate peak or null of the receiver output signal. In the example of FIGS. 4 and 5, the time to be determined is $t_1$, which is the time it takes for the rotating receiver vector to travel from the x axis ($t=0$) to the position of the formation dip azimuth projection. Then we have $$\theta_f = \omega t_1. \qquad (4)$$

It will be understood that depending upon the qudrant in which the formation dip azimuth is located, the appropriate time reference may be either $t_1$ or $t_3$. This possible ambiguity can be overcome by consistently using either the occurrence of positive peaks or negative peaks of the receiver output as a measurement time. In practice, if the time of a null (or zero-crossing) is instead measured, one can consistently use either positive-going zero-crossings or negative-going zero-crossings, and then subtract $\pi/2$; i.e., for example:

$$\theta_f = \omega t_2 - \pi/2. \qquad (5)$$

When a value of $\theta_f$ has been determined, it can be utilized to obtain new vales of $\sin \theta_T$ and $\cos \theta_T$. These values are fed to the transmitter so that the transmiter vector $\overline{M}_T$ will move in the formation dip azimuth direction as the next step is implemented; namely, an adjustment of the transmitter vector tilt angle. (The new values of $\sin \theta_T$ and $\cos \theta_T$ are also fed to the receiver so that the receiver vector $\overline{M}_R$ continues to "track" in a plane perpendicular to $M_T$.) The adjustment of the transmitter tilt angle is implemented as a function of the dip error signal. That is, $\phi_T$ (and $\sin \phi_T$ and $\cos \phi_T$) is increased in accordance with the measured dip error signal, $\phi_E$. Any residual dip error signal subsequently measured can be used to adjust the value of $\phi_T$ until the dip error signal is reduced to zero or some acceptable minimum value. The final value of $\phi_T$ is adopted and recorded as the formation dip angle, $\phi_f$, at the particular depth level.

Reference is now again made to FIG. 1 for a description of embodiment of circuitry utilized to implement the techniques just described. An oscillator 210 operates at a suitable induction logging frequency. The output of oscillator 210 is coupled to multiplying amplifiers 211, 212 and 213 which are respectively designated as the $T_x$ amplifier, the $T_y$ amplifier, and the $T_z$ amplifier. The output of amplifier 211 is coupled to transmitter coil $T_x$, the output of amplifier 212 is coupled to transmitter coil $T_y$, and the output of amplifier 213 is coupled to coil $T_z$. Amplifier 211 receives at its multiplier inputs signals proportional to $\cos \theta_T$ and $\sin \phi_T$. Amplifier 212 receives at its multiplier inputs two signals respectively proportional to $\sin \theta_T$ and $\sin \phi_T$. Amplifier 213 receives at its multiplier input a signal proportional to $\cos \phi_T$. (The source of these and other signals will be treated hereinbelow). It is seen that the outputs of the amplifiers 211, 212 and 213 are respectively the outputs required by Table I for steering the transmitter effective magnetic moment in accordance with equation (1) to a direction defined by the angles $\theta_T$ and $\phi_t$.

The receiver coil $R_x$ is coupled to both a multiplying amplifier 221 and another multiplying amplifier 222. In the embodiment of FIG. 1, the amplifiers in the receiver circuitry are used to apply the appropriate amplification or sensitivity factors to "steer" the effective receiver moment direction. Amplifier 221 receives multiplying input signals proportional to $-\sin \omega t$ and $\sin \theta_T$. Amplifier 222 receives multiplying input signals proportional to cos ωt, cos $\theta_T$, and cos $\phi_T$. The receiver coil $R_y$ is coupled to each of two multiplying amplifiers 223 and 224. Amplifier 223 receives multiplying input signals proportional to sin ωt and cos $\theta_T$. Amplifier 224 receives multiplying input signals proportional to cos ωt, sin $\theta_T$, and cos $\phi_T$. The receiver coil $R_z$ is coupled to multiplying amplifier 225 which receives multiplying input signals proportional to −cos ωt and sin $\phi_T$. The negative signals are implemented by applying them to negative polarity input terminals of their respective amplifiers, or by providing inverters. The outputs of amplifiers 221 and 222 are coupled to the inputs of summing amplifier 226, and the outputs of amplifiers 223 and 224 are coupled to the inputs of summing amplifier 227. The outputs of summing amplifiers 226 and 227 are, in turn, coupled to the input of another summing amplifier 228 which receives as a further input the output of amplifier 225.

The output of summing circuit 228 is readily seen to be proportional to the receiver magnetic moment that is set forth in equation (2). In particular, the outputs of amplifiers 226, 227 and 225 are respectively proportional to the desired x, y, and z component factors set forth in Table II above. When these outputs are added together, they yield a receiver signal $\overline{B} \cdot \overline{M}_R$ where $\overline{B}$ is a vector representative of the induced magnetic field from the formations and $\overline{M}_R$ is a unit receiver vector rotating at an angular frequency ω in a plane perpendicular to the unit transmitter magnetic moment vector $\overline{M}_T$.

The output of summing amplifier 228 is coupled to a phase detector 230. The other input to detector 230 is a reference signal at the induction logging frequency derived from oscillator 210. Detector 230 removes the induction logging frequency and generates a receiver output signal of the type illustrated in FIG. 5. The output of detector 230 is coupled to another detector 240 which receives as its second input a signal at angular frequency ω, this signal being derived from an oscillator 245. Recalling from FIG. 5 that the receiver output signal varies sinusoidally as a function of ω, it can be understood that the output of detector 240 will be a positive or negative D.C. signal representative of the dip error signal, $\phi_E$.

The output of oscillator 245 is also coupled to a sin, cos generator 246 that is operative to generate the signals sin ωt and cos ωt. These signals are also utilized in already-described portions of the receiver circuitry to obtain the desired rotation of the receiver vector $\overline{M}_R$ in the plane parallel to the transmitter vector.

The output of detector 230 is also coupled to a zero-crossing detector 250 which is operative to produce an output signal upon the occurrence of each positive-going zero-crossing in the receiver output signal. This output from the zero-crossing detector is coupled to a timing circuit 260 which receives as its other input a signal from a reference detector 265. The reference detector, in turn, receives the signals representative of sin ωt and cos ωt which are available from generator 246. The reference detector is operative to produce an output whenever both sin ωt=0 and cos ωt=1. This condition occurs at the time t=0; i.e., the time when the rotating receiver vector is aligned with the x axis. The timer 260, which may comprise an analog ramp circuit, is reset to zero by the output of reference detector 265 and produces an output whose magnitude is representative of the time elapsed until the next positive-going zero-crossing. This time, designated $t_n$ (and which will be, for example $t_1$ in FIGS. 4 and 5), is related to the formation dip azimuth angle $\theta_f$ in accordance with $\theta_f = \omega t_n - \pi/2$.

The output of timing circuit 260 is coupled via contact 1 of a relay section 300B to a holding circuit 270. The output of holding circuit 270 is coupled to sin, cos generator 275 that generates signals designated sin $\theta'$ and cos $\theta'$. The output of detector 240 is coupled, via contact 2 of a relay section 300A, to an analog-to-digital converter 280 having two outputs, 280A and 280B, that are coupled to up-down counter 281. Positive inputs to A/D converter 280 are output as digital signals on line 280A which causes counter 281 to count up, while negative inputs to A/D converter are output as digital signals on line 280B which causes counter 281 to count down. The counter 281 is coupled, via D/A converter 282, to a sin, cos generator 285. The outputs of sin, cos generator 285 are respectively designated sin $\phi'$ and cos $\phi'$.

The outputs designated sin $\phi'$ and cos $\phi'$ are respectively coupled to contacts 2 of the relay sections 300C and 300D. The outputs designated sin $\theta'$ and cos $\theta'$ are respectively coupled to contact 2 of the relay sections 300E and 300F. Contact 1 of relay sections 300C, 300D, 300E, and 300F are respectively coupled to signals at respective levels of zero (sin $\phi_T = 0$), unity (cos $\phi_T = 1$), zero (sin $\theta_T = 0$), and unity (cos $\theta_T = 1$). The wiper contacts of relay sections 300C, 300D, 300E and 300F are coupled, as sin $\phi_T$, cos $\phi_T$, sin $\theta_T$ and cos $\theta_T$, respectively, to the appropriate inputs of the transmitter multiplying amplifiers 211–213 and receiver multiplying amplifiers 221–225. The outputs sin ωt and cos ωt of generator 246 are also coupled to the appropriate inputs of these multiplying amplifiers. The relay sections 300A, 300B, . . . 300F are under common control, from the earth's surface, as indicated by dashed line 300X.

In the present embodiment, both signals from relay section 300A, the input to holding circuit 270, and the output of counter 281 are transmitted to the surface of the earth via armored multiconductor cable 15. Compass and inclinometer information will also typically be transmitted to the earth's surface. Further, the signals cos $\phi_T$, sin $\phi_T$, cos $\phi_T$ and sin$\theta_T$ may optionally be sent to the surface. At the earth's surface the signals transmitted from downhole are recorded by recorder 350 as a function of borehole depth. The recorder 350 is conventionally provided with means (not shown) synchronized with the length of cable 15 and, accordingly, with the depth of the downhole logging device.

During a "mode 1" operation, each relay stage wiper is connected to contact 1, and this can be seen to result in the starting condition described in conjunction with FIG. 4. In particular, fixed values of sin$\phi_T$, cos$\phi_T$, sin$\theta_T$ and cos$\theta_T$ are used to steer the transmitter vector $\overline{M}_T$ in the z direction and establish an initial azimuth reference along the z axis. In this condition $\theta_f$ is determined at timing circuit 260 (contact 1 of relay section 300B) and recorded. Also, the dip error signal $\phi_E$ in mode 1 (contact 1 of relay section 300A) is recorded as indicative of the presence of anisotropy. Mode 2 operation can then be implemented (either manually or automatically) by switching each relay stage wiper to contact 2. Now, the values of sin $\theta'$ and cos $\theta'$, each derived from the receiver output during mode 1, are used as sin $\theta_T$ and cos $\theta_T$ to rotate the transmitter vector in the direction of the bedding plane dip azimuth. At the same time sin $\phi'$ and cos $\phi'$ are operative to rotate the transmitter tilt angle, as necessary, toward the normal to the bedding plane. It can be seen that any tilt error will be manifested as a dip error signal $\phi_E$ (output of detector 240) which will cause the count in counter 281 to be adjusted up or down. This, in turn, will cause adjustment of sin $\phi'$ and cos $\phi'$ that will reduce the dip error signal. The feedback arrangement results in a counter output that represents $\phi_f$. At this point the dip error signal $\phi_E$ should approach zero. At the next depth level, if no severe formation dip change has occurred, the counter 281 will not have to be modified very much, so the time for stabilization of the feedback process will be shorter than if, say, the counter 281 was always initialized at some fixed value.

The invention has been described with reference to a particular embodiment, but variations within the spirit and scope of the invention will occur to those skilled in the art. For example, it will be understood that if no significant receiver signal is obtained during mode 1, the transmitter vector direction could be modified to obtain a receiver signal from which $\theta_f$ can be determined (assuming the formations are anisotropic). Also, it will be understood that a choice of digital, analog and/or manual techniques could be employed to implement or simulate the various circuit and/or operational functions hereof.

I claim:

1. Apparatus for determining properties of subsurface formations surrounding a borehole, comprising:
    an array of transmitter coils;
    an array of receiver coils;
    means for individually energizing said transmitter coils;
    electronic transmitter steering means for controlling said energizing means to electronically steer the direction of the magnetic moment resulting from the magnetic field components generated by said transmitter coils, and
    receiver processing means for processing the signals induced in said receiver coils, said receiver processing means including means for individually sensing the signals induced in said receiver coils and for combining the sensed signals; and electronic receiver steering means for controlling the relative sensitivities of said individual sensing means to steer the effective sensing direction of the receiver processing means.

2. Apparatus as defined by claim 1 wherein said electronic transmitter steering means is operative to steer the direction of the transmitter magnetic moment in three dimensions.

3. Apparatus as defined by claim 1 wherein said electronic receiver steering means is operative to steer the effective sensing direction of the receiver processing means in three dimensions.

4. Apparatus as defined by claim 2 wherein said electronic receiver steering means is operative to steer the effective sensing direction of the receiver processing means in three dimensions.

5. Apparatus as defined by claim 1 wherein said electronic receiver steering means is coordinated with said electronic transmitter steering means and is operative to steer the effective sensing direction of said receiver processing means in a direction substantially perpendicular to the direction of the transmitter magnetic moment.

6. Apparatus as defined by claim 2 wherein said electronic receiver steering means is coordinated with said electronic transmitter steering means and is operative to steer the effective sensing direction of said receiver processing means in a direction substantially perpendicular to the direction of the transmitter magnetic moment.

7. Apparatus as defined by claim 4 wherein said electronic receiver steering means is coordinated with said electronic transmitter steering means and is operative to steer the effective sensing direction of said receiver processing means in a direction substantially perpendicular to the direction of the transmitter magnetic moment.

8. Apparatus as defined by claim 1 wherein said electronic receiver steering means is operative to rotate the effective sensing direction of said receiver processing means in a plane substantially perpendicular to the direction of the transmitter magnetic moment.

9. Apparatus as defined by claim 2 wherein said electronic receiver steering means is operative to rotate the effective sensing direction of said receiver processing means in a plane substantially perpendicular to the direction of the transmitter magnetic moment.

10. Apparatus as defined by claim 4 wherein said electronic receiver steering means is operative to rotate the effective sensing direction of said receiver processing means in a plane substantially perpendicular to the direction of the transmitter magnetic moment.

11. Apparatus as defined by claim 8 wherein said receiver processing means is operative to generate a receiver signal having an amplitude and phase which are functions of the angular differences between the plane of said rotating effective sensing direction and the plane of the surrounding formation bed.

12. Apparatus as defined by claim 9 wherein said receiver processing means is operative to generate a receiver signal having an amplitude and phase which are functions of the angular differences between the plane of said rotating effective sensing direction and the plane of the surrounding formation bed.

13. Apparatus as defined by claim 10 wherein said receiver processing means is operative to generate a receiver signal having an amplitude and phase which are functions of the angular differences between the plane of said rotating effective sensing direction and the plane of the surrounding formation bed.

14. Apparatus as defined by claim 11 wherein said receiver processing means includes means responsive to said receiver signal for adjusting the electronic transmitter steering means toward a direction perpendicular to the plane of the surrounding formation bed.

15. Apparatus as defined by claim 12 wherein said receiver processing means includes means responsive to said receiver signal for adjusting the electronic transmitter steering means toward a direction perpendicular to the plane of the surrounding formation bed.

16. Apparatus as defined by claim 13 wherein said receiver processing means includes means responsive to said receiver signal for adjusting the electronic transmitter steering means toward a direction perpendicular to the plane of the surrounding formation bed.

17. Apparatus for determining the dip and/or dip azimuth of formations surrounding a borehole, comprising:
    first, second, and third transmitter coils having mutually orthogonal axes;
    means for individually energizing said transmitter coils;

electronic transmitter steering means for controlling said energizing means to electronically steer the direction of the magnetic moment resulting from the magnetic field components generated by said transmitter coils;

first, second, and third receiver coils having mutually orthogonal axes; and receiver processing means for processing the signals induced in said receiver coils.

18. Apparatus as defined by claim 17 wherein said receiver processing means includes:

means for individually sensing the signals induced in said receiver coils and for combining the sensed signals; and electronic receiver steering means for controlling the relative sensitivities of said individual sensing means to steer the effective sensing direction of the receiver processing means.

19. Apparatus as defined by claim 18 wherein said electronic receiver steering means is coordinated with said electronic transmitter steering means and is operative to steer the effective sensing direction of said receiver processing means in a direction substantially perpendicular to the direction of the transmitter magnetic moment.

20. Apparatus as defined by claim 19 wherein said electronic receiver steering means is operative to rotate the effective sensing direction of said receiver processing means in a plane substantially perpendicular to the direction of the transmitter magnetic moment.

21. Apparatus as defined by claim 20 wherein said receiver processing means is operative to generate a receiver signal having an amplitude and phase which are functions of the angular differences between the plane of said rotating effective sensing direction and the plane of the surrounding formation bed.

22. Apparatus as defined by claim 21 wherein said receiver processing means includes means responsive to said receiver signal for adjusting the electronic transmitter steering means toward a direction perpendicular to the plane of the surrounding formation bed.

23. A method for determining the dip and/or dip azimuth of a formation bedding plane surrounding a borehole, comprising the steps of:

(a) transmitting electromagnetic energy into said formations from an electronically steerable transmitter within said borehole;

(b) receiving, at an electronically steerable receiver within said borehole, induced electromagnetic signals;

(c) rotating the receiver direction in a plane substantially perpendicular to the direction of said transmitter;

(d) detecting the receiver output;

(e) varying the transmitter direction as a function of the receiver output; and (f) repeating steps (c), (d), and (e) until the transmitter direction is substantially perpendicular to the formation bedding plane.

24. The method as defined by claim 23 further comprising the steps of recording the receiver output and the transmitter direction.

25. The method as defined by claim 23 wherein the transmitter azimuthal direction is varied as a function of the phase of the receiver output.

26. The method as defined by claim 24 wherein the transmitter azimuthal direction is varied as a function of the phase of the receiver output.

27. The method as defined by claim 23 wherein the transmitter tilt angle is varied as a function of the peak magnitude of the receiver output.

28. The method as defined by claim 26 wherein the transmitter tilt angle is varied as a function of the peak magnitude of the receiver output.

29. Apparatus for determining properties of subsurface formations surrounding a borehole, comprising:

an array of transmitter coils;

an array of receiver coils;

means for individually energizing said transmitter coils;

electronic transmitter steering means for controlling said energizing means to electronically steer, in three dimensions, the direction of the magnetic moment resulting from the magnetic field components generated by said transmitter coils; and receiver processing means for processing the signals induced in said receiver coils.

30. Apparatus as defined by claim 29 wherein said electronic receiver steering means is operative to steer the effective sensing direction of the receiver processing means in three dimensions.

31. Apparatus for determining properties of subsurface formations surrounding a borehole, comprising:

an array of transmitter coils;

an array of receiver coils;

means for individually energizing said transmitter coils;

electronic transmitter steering means for controlling said energizing means to electronically steer the direction of the magnetic moment resulting from the magnetic field components generated by said transmitter coils; and receiver processing means for processing the signals induced in said receiver coils, said receiver processing means including electronic receiver steering means for electronically steering the direction of said receiver processing means in three dimensions.

* * * * *

UNITED STATES PATENT AND TRADEMARK OFFICE
CERTIFICATE OF CORRECTION

PATENT NO. : 4,360,777

DATED : November 23, 1982

INVENTOR(S) : Francis Segesman

It is certified that error appears in the above—identified patent and that said Letters Patent is hereby corrected as shown below:

In the Specification, column 1, line 67, "voltage" should read --voltages--. Column 2, line 14, "3,187,352" should read --3,187,252--; line 58, "provided ," should read --provided,--.

Signed and Sealed this

Fifteenth Day of November 1983

[SEAL]

Attest:

GERALD J. MOSSINGHOFF

Attesting Officer

Commissioner of Patents and Trademarks